United States Patent
Oh et al.

(10) Patent No.: US 11,936,773 B2
(45) Date of Patent: Mar. 19, 2024

(54) ENCRYPTION KEY MANAGEMENT METHOD IN DATA SUBSCRIPTION SYSTEM

(71) Applicant: Penta Security Inc., Seoul (KR)

(72) Inventors: Jin Hyeok Oh, Gwangmyeong-si (KR); Sang Jun Lee, Suwon-si (KR); Myong Cheol Lim, Seoul (KR); Sang Gyoo Sim, Seoul (KR); Duk Soo Kim, Seoul (KR); Seok Woo Lee, Seoul (KR)

(73) Assignee: Penta Security Inc., Seoul (KR)

( * ) Notice: Subject to any disclaimer, the term of this patent is extended or adjusted under 35 U.S.C. 154(b) by 334 days.

(21) Appl. No.: 17/529,601

(22) Filed: Nov. 18, 2021

(65) Prior Publication Data
US 2023/0142949 A1    May 11, 2023

(30) Foreign Application Priority Data
Nov. 9, 2021   (KR) .......................... 10-2021-0153094

(51) Int. Cl.
*H04L 9/08*   (2006.01)
*H04L 9/06*   (2006.01)

(52) U.S. Cl.
CPC .......... *H04L 9/0825* (2013.01); *H04L 9/0643* (2013.01); *H04L 9/0822* (2013.01); *H04L 9/085* (2013.01)

(58) Field of Classification Search
CPC ... H04L 9/0825; H04L 9/0643; H04L 9/0822; H04L 9/085; H04L 9/0861; H04L 9/088; H04L 2209/60; H04L 9/0891
See application file for complete search history.

(56) References Cited

U.S. PATENT DOCUMENTS

2003/0198351 A1* 10/2003 Foster ................ H04L 63/10
                                                                    713/181
2008/0080713 A1*  4/2008 Cho .................. H04W 12/0471
                                                                    380/273

(Continued)

FOREIGN PATENT DOCUMENTS

KR    1020190062799 A    6/2019
WO    2020-242062 A1    12/2020
WO    2021-107389 A1     6/2021

*Primary Examiner* — Michael R Vaughan
*Assistant Examiner* — Ethan V Vo
(74) *Attorney, Agent, or Firm* — BROADVIEW IP LAW, PC

(57) ABSTRACT

An encryption key management method includes: receiving a data registration request from a supplier terminal, determining a data identifier associated with the content data, encrypting a master key with a public key of the supplier terminal, and providing the supplier terminal with the master key encrypted with the public key of the supplier terminal, the data identifier, and a key update count value; receiving a subscription application related to the data identifier from a first subscriber terminal, encrypting the master key with a public key of the first subscriber terminal, and providing the first subscriber terminal with the master key encrypted with the public key of the first subscriber terminal and the key update count value; receiving encrypted content data encrypted with the symmetric key and a hash for the content data from the supplier terminal; and transmitting the encrypted content data and the hash to the first subscriber terminal.

14 Claims, 9 Drawing Sheets

(56) References Cited

U.S. PATENT DOCUMENTS

| | | | |
|---|---|---|---|
| 2009/0136207 A1* | 5/2009 | Ayaki | G11B 20/00086 386/200 |
| 2017/0076097 A1* | 3/2017 | Ali | G06F 21/10 |
| 2019/0052467 A1* | 2/2019 | Bettger | H04L 9/088 |
| 2019/0363883 A1* | 11/2019 | Rao | H04L 9/0825 |
| 2020/0106609 A1* | 4/2020 | Osborn | H04L 9/0891 |
| 2023/0325473 A1* | 10/2023 | Buffard | G06F 21/1064 713/155 |

* cited by examiner

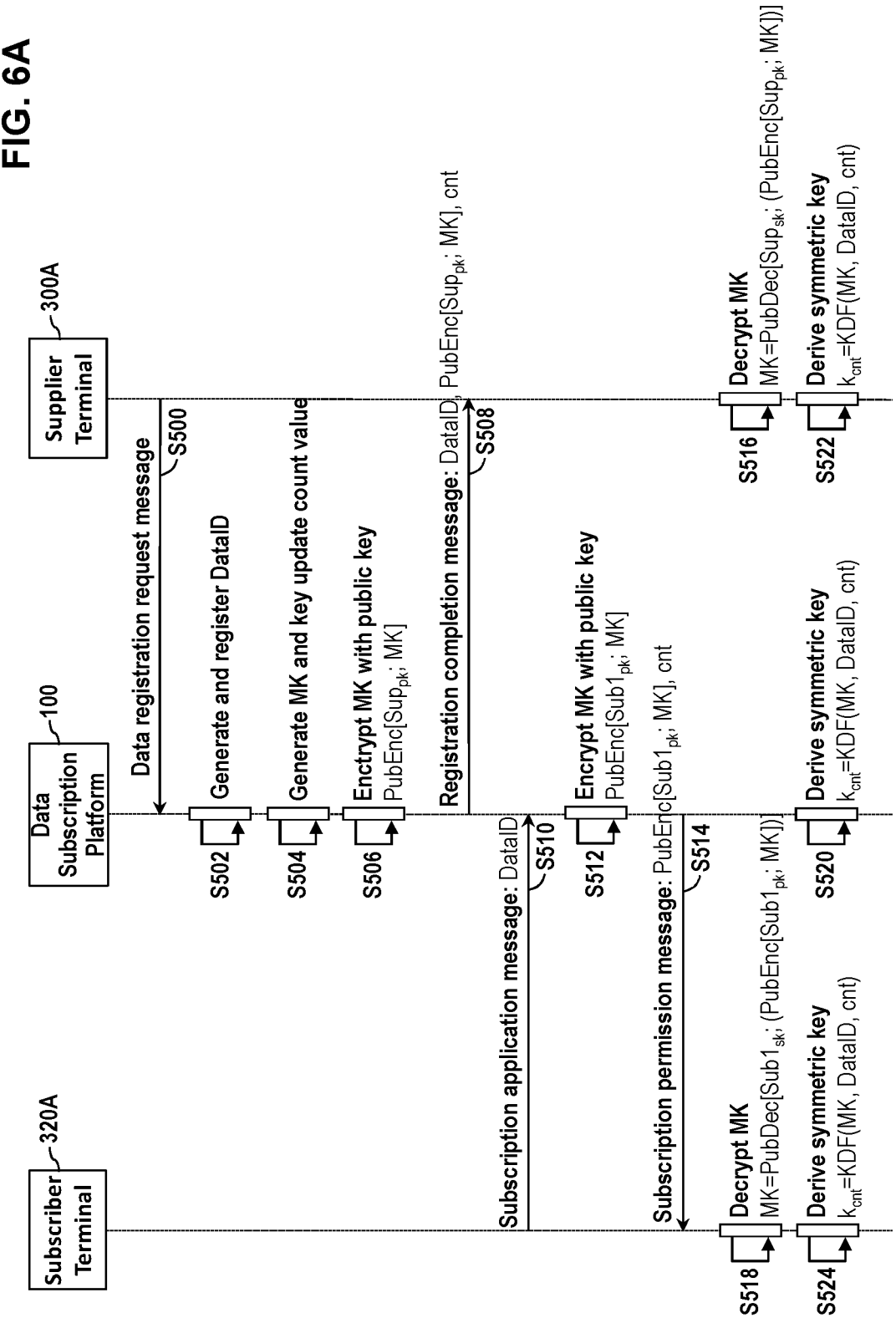

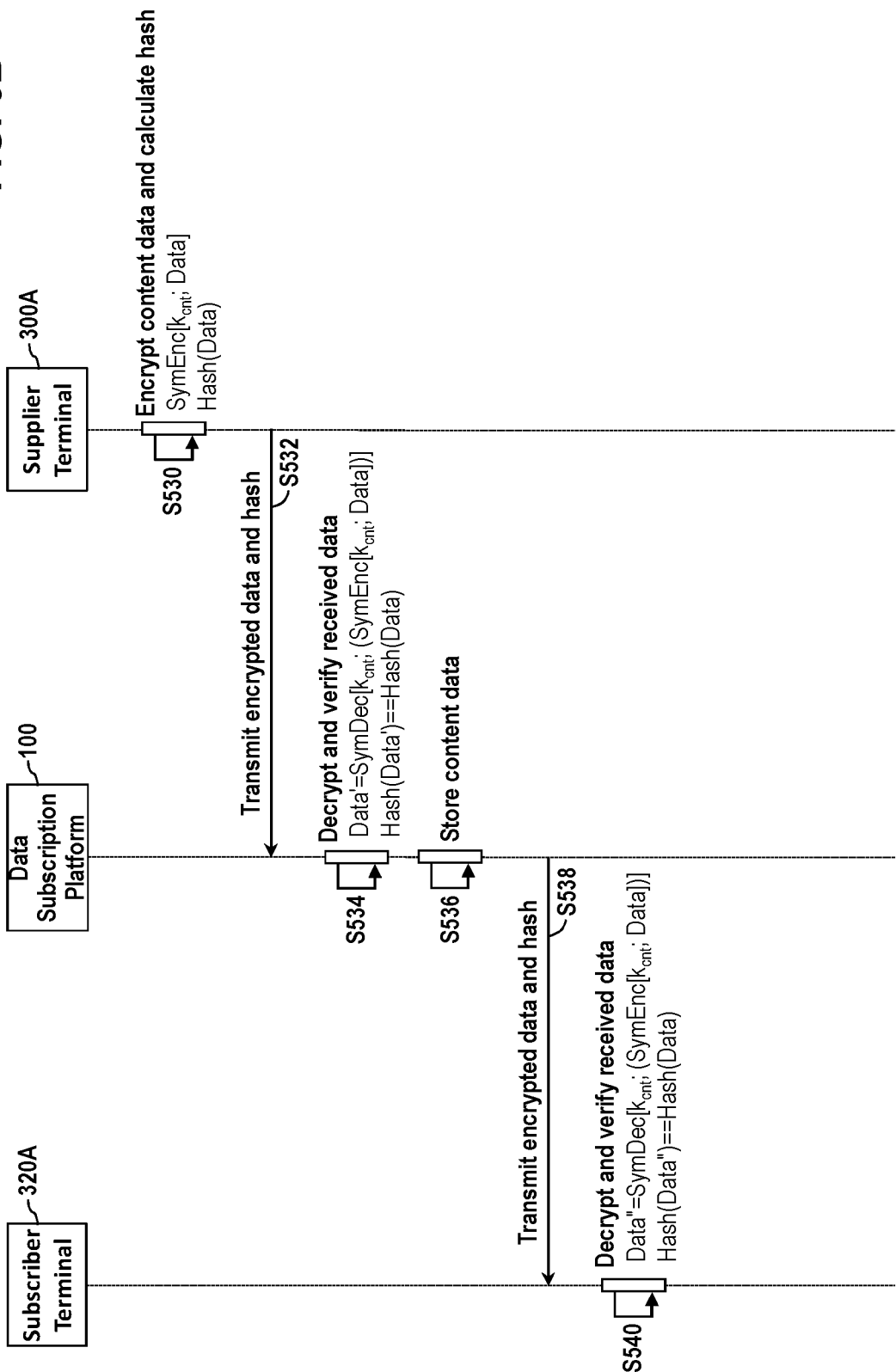

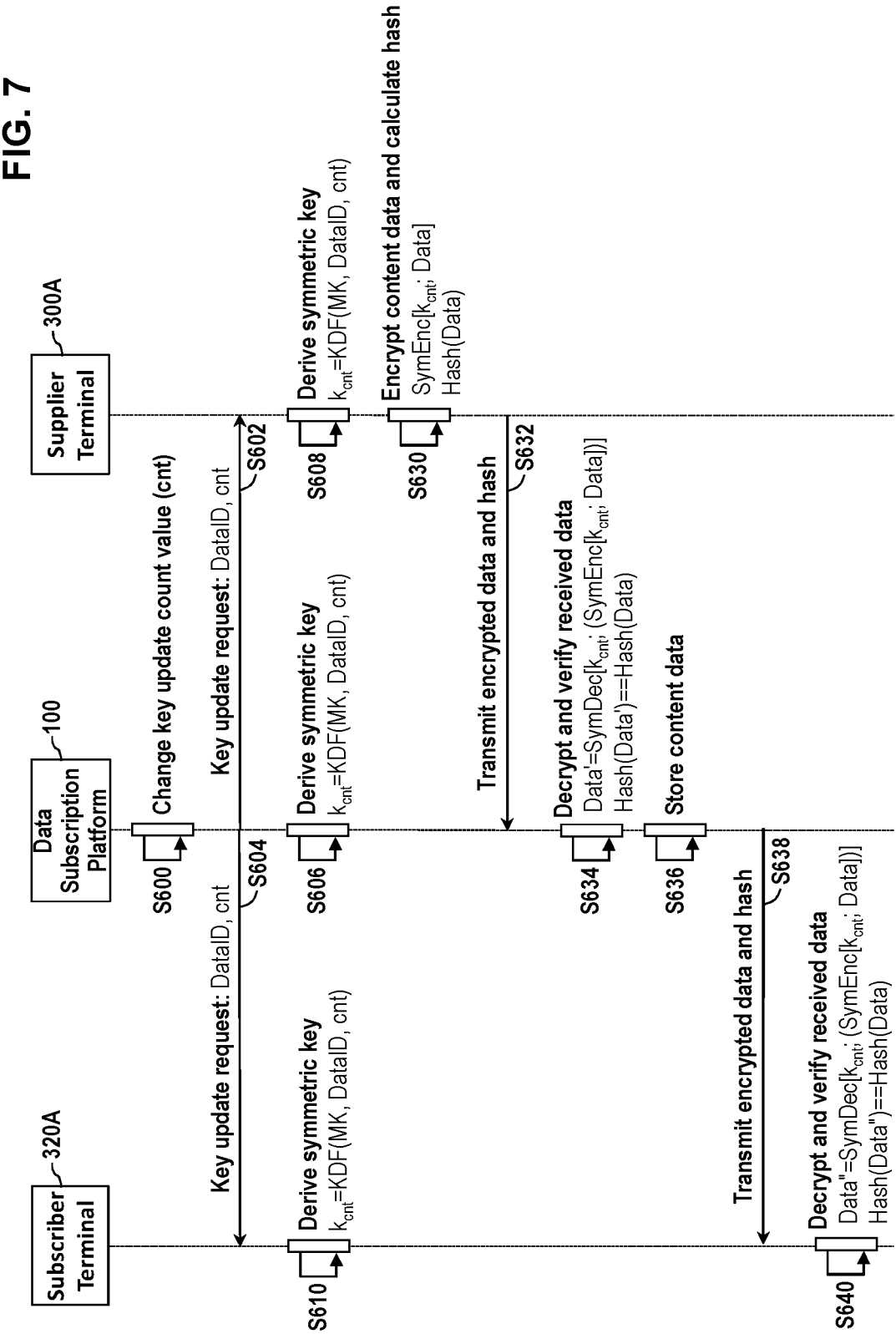

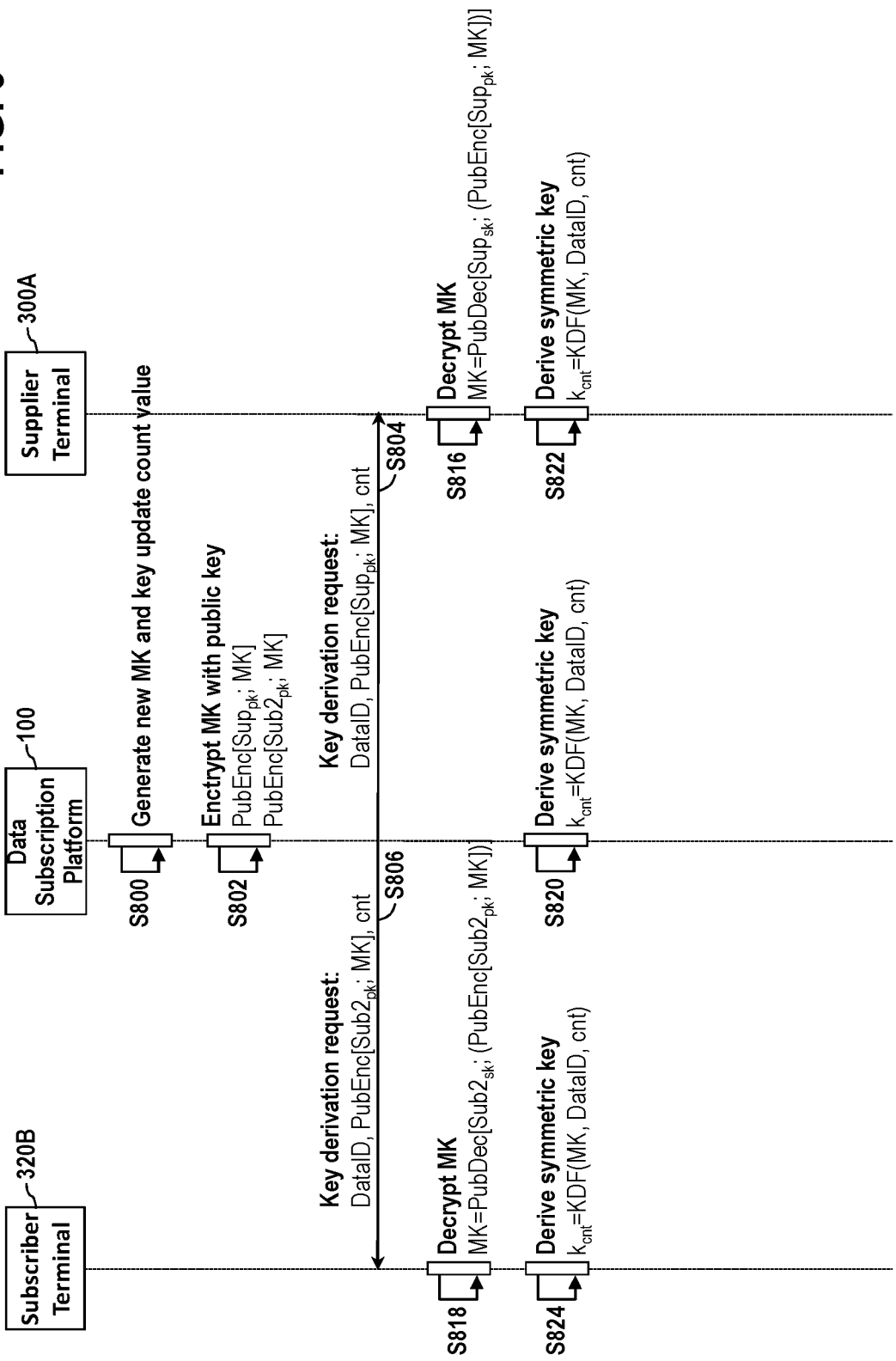

ENCRYPTION KEY MANAGEMENT METHOD IN DATA SUBSCRIPTION SYSTEM

CROSS-REFERENCE TO RELATED APPLICATION

The present application claims a convention priority based on Korean Patent Application No. 10-2021-0153094 filed on Nov. 9, 2021, with the Korean Intellectual Property Office (KIPO), the entire content of which is incorporated herein by reference.

BACKGROUND

1. Technical Field

The present disclosure relates to a data transaction mediation method and, more particularly, to a data transaction mediation method between a data provider and a data subscriber in a data subscription system where the data subscriber pays a regular subscription fee to use data provided by the data provider. Also, the present disclosure relates to an encryption key management method associated with a generation, change, and revocation of an encryption key.

2. Related Art

Data collected and aggregated from various sources is regarded as a kind of resource. Big data accumulated from human activities or acquired from various sources such as sensors is acting as a basis for an individual or organizational decision-making, and artificial intelligences trained using data representing typical real-world situations are being used in almost all industries. In an economic structure where the use of data is regarded as an important production factor of an economic activity, data transactions between data providers and data consumers are rapidly increasing also.

Due to doubts about data quality and difficulties in reasonable pricing of data, however, it is difficult to expect a formation and operation of a rational and efficient data transaction open market. Accordingly, expanding is a subscription-type transaction in which a data consumer pays a subscription fee regularly to receive data and a provider supplies data of high quality on the premise of a distribution of the subscription fee. Such a data subscription service may gradually resolve a price gap between the provider and the subscriber and allows the provider to secure a stable profit while allowing the subscriber to save time and efforts needed for data selection and obtain the data of a quality fulfilling an expectation.

In the data subscription service, the data provided to the subscriber needs to be encrypted because the data may be leaked to a third party other than the subscriber through a data sharing or resale if the data is not encrypted and provided in a plain text. In addition, a verification of data integrity is required because the data may be forged or falsified during the process of a delivery from the provider to the subscriber through the subscription platform. A public key infrastructure (PKI) may be used to prevent the illegal sharing and duplication and verify the integrity of the data. However, a typical PKI alone may not meet the system requirements because generations, changes, and revocations of keys may be frequently needed according to new subscriptions and withdrawals of the providers and subscribers in the data subscription system where multiple providers and subscribers are involved.

SUMMARY

Provided is an encryption key management method reducing a possibility of illegal data sharing and duplication, enabling a verification of a data integrity, and facilitating a generation, change, and revocation of a key for a user in a data subscription system.

According to an aspect of an exemplary embodiment, provided is an encryption key management method in a data subscription platform server accessible by a supplier terminal and at least one subscriber terminal through a network. The method includes: receiving a data registration request of content data from the supplier terminal, determining a data identifier (DataID) associated with the content data, encrypting a master key (MK) with a public key of the supplier terminal, and providing the supplier terminal with the master key encrypted with the public key of the supplier terminal, the data identifier, and a key update count value (cnt) to enable the supplier terminal to decrypt the master key encrypted with the public key of the supplier terminal and derive a symmetric key based on the master key (MK), the data identifier (DataID), and the key update count value (cnt); receiving a subscription application related to the data identifier (DataID) from a first subscriber terminal, encrypting the master key with a public key of the first subscriber terminal, and providing the first subscriber terminal with the master key encrypted with the public key of the first subscriber terminal and the key update count value to enable the first subscriber terminal to decrypt the master key encrypted with the public key of the first subscriber terminal and derive the symmetric key based on the master key (MK), the data identifier (DataID), and the key update count value (cnt); receiving encrypted content data encrypted with the symmetric key and a hash for the content data from the supplier terminal, decrypting the encrypted content data, and verifying the content data using the hash; and transmitting the encrypted content data and the hash to the first subscriber terminal to enable the first subscriber terminal to decrypt the encrypted content data, verify the content data using the hash, and use the content data.

The method may further include: changing the key update count value; and transmitting a key update request message including the data identifier and a changed key update count value to the supplier terminal and the first subscriber terminal to enable the supplier terminal and the first subscriber terminal to update the symmetric key by deriving based on the master key, the data identifier, and the changed key update count value.

The changing of the key update count value may include changing the key update count value into a number determined by a predetermined rule.

The changing of the key update count value may include determining the key update count value based on a random number generated by a random number generator.

The method may further include: receiving a subscription application related to the data identifier (DataID) from a second subscriber terminal, encrypting the master key with a public key of the second subscriber terminal, and providing the second subscriber terminal with the master key encrypted with the public key of the second subscriber terminal and the key update count value to enable the second subscriber terminal to decrypt the master key encrypted with the public key of the second subscriber terminal and derive the symmetric key based on the master key (MK), the data identifier (DataID), and the key update count value (cnt). The encrypted content data and the hash for the content data may be transmitted to the second subscriber terminal as well as the first subscriber terminal.

The method may further include: checking a withdrawal of subscription of the first subscriber terminal; generating an updated master key; encrypting an updated master key with the public key of the supplier terminal and providing the supplier terminal with an encrypted and updated master key encrypted with the public key of the supplier terminal and the data identifier to enable the supplier terminal to decrypt the encrypted and updated master key encrypted with the public key of the supplier terminal and derive the symmetric key based on the master key, the data identifier, and the key update count value; and encrypting the updated master key with the public key of the second subscriber terminal and providing the second subscriber terminal with an encrypted and updated master key encrypted with the public key of the second subscriber terminal and the data identifier to enable the second subscriber terminal to decrypt the encrypted and updated master key encrypted with the public key of the second subscriber terminal and derive the symmetric key based on the master key, the data identifier, and the key update count value.

The generating of the updated master key may include changing the key update count value. A changed key update count value may be additionally provided to the supplier terminal when the encrypted and updated master key encrypted with the public key of the supplier terminal and the data identifier are provided to the supplier terminal. The changed key update count value may be additionally provided to the second subscriber terminal when the encrypted and updated master key encrypted with the public key of the second subscriber terminal and the data identifier are provided to the second subscriber terminal.

According to another aspect of an exemplary embodiment, provided is an apparatus for providing a data subscription service managing an encryption key suitable for providing content data received from a supplier terminal to at least one subscriber terminal based on a subscription application. The apparatus includes: at least one processor; and a memory storing instructions executable by the at least one processor. When executed by the at least one processor, the instructions cause the at least one processor to: receive a data registration request of content data from the supplier terminal, determine a data identifier (DataID) associated with the content data, encrypting a master key (MK) with a public key of the supplier terminal, and provide the supplier terminal with the master key encrypted with the public key of the supplier terminal, the data identifier, and a key update count value (cnt) to enable the supplier terminal to decrypt the master key encrypted with the public key of the supplier terminal and derive a symmetric key based on the master key (MK), the data identifier (DataID), and the key update count value (cnt); receive a subscription application related to the data identifier (DataID) from a first subscriber terminal, encrypt the master key with a public key of the first subscriber terminal, and provide the first subscriber terminal with the master key encrypted with the public key of the first subscriber terminal and the key update count value to enable the first subscriber terminal to decrypt the master key encrypted with the public key of the first subscriber terminal and derive the symmetric key based on the master key (MK), the data identifier (DataID), and the key update count value (cnt); receive encrypted content data encrypted with the symmetric key and a hash for the content data from the supplier terminal, decrypt the encrypted content data, and verify the content data using the hash; and transmit the encrypted content data and the hash to the first subscriber terminal to enable the first subscriber terminal to decrypt the encrypted content data, verify the content data using the hash, and use the content data.

The instructions, when executed by the at least one processor, may further cause the at least one processor to: change the key update count value; and transmit a key update request message including the data identifier and a changed key update count value to the supplier terminal and the first subscriber terminal to enable the supplier terminal and the first subscriber terminal to update the symmetric key by deriving based on the master key, the data identifier, and the changed key update count value.

The instructions causing the at least one processor to change the key update count value may cause the at least one processor to change the key update count value into a number determined by a predetermined rule.

The instructions causing the at least one processor to change the key update count value may cause the at least one processor to determine the key update count value based on a random number generated by a random number generator.

The instructions, when executed by the at least one processor, may further cause the at least one processor to receive a subscription application related to the data identifier (DataID) from a second subscriber terminal, encrypt the master key with a public key of the second subscriber terminal, and provide the second subscriber terminal with the master key encrypted with the public key of the second subscriber terminal and the key update count value to enable the second subscriber terminal to decrypt the master key encrypted with the public key of the second subscriber terminal and derive the symmetric key based on the master key (MK), the data identifier (DataID), and the key update count value (cnt). The encrypted content data and the hash for the content data may be transmitted to the second subscriber terminal as well as the first subscriber terminal.

The instructions, when executed by the at least one processor, may further cause the at least one processor to: check a withdrawal of subscription of the first subscriber terminal; generate an updated master key; encrypt an updated master key with the public key of the supplier terminal and provide the supplier terminal with an encrypted and updated master key encrypted with the public key of the supplier terminal and the data identifier to enable the supplier terminal to decrypt the encrypted and updated master key encrypted with the public key of the supplier terminal and derive the symmetric key based on the master key, the data identifier, and the key update count value; and encrypt the updated master key with the public key of the second subscriber terminal and provide the second subscriber terminal with an encrypted and updated master key encrypted with the public key of the second subscriber terminal and the data identifier to enable the second subscriber terminal to decrypt the encrypted and updated master key encrypted with the public key of the second subscriber terminal and derive the symmetric key based on the master key, the data identifier, and the key update count value.

The instructions causing the at least one processor to generate the updated master key may cause the at least one processor to change the key update count value. A changed key update count value may be additionally provided to the supplier terminal when the encrypted and updated master key encrypted with the public key of the supplier terminal and the data identifier are provided to the supplier terminal. The changed key update count value may be additionally provided to the second subscriber terminal when the encrypted and updated master key encrypted with the public key of the second subscriber terminal and the data identifier are provided to the second subscriber terminal.

The encryption key management method according to an exemplary embodiment of the present disclosure may reduce the possibility of illegal data sharing and duplication, enable the verification of the data integrity, and facilitate the generation, change, and revocation of the keys for the users in the data subscription system.

In particular, according to an exemplary embodiment of the present disclosure, since the symmetric key is derived based on the data identifier and the key update count value as well as the master key, an entity having no permission to a category cannot derive the symmetric key for the data identifier associated with the category and thus cannot decrypt and use the content data belonging to the category. Meanwhile, when an unsubscription occurs, the symmetric key of the supplier terminal and the remaining subscriber terminal may be updated by the derivations based on a new master key, but the symmetric key of the unsubscribed terminal is not updated any more. Therefore, the symmetric key of the unsubscribed terminal is substantially revoked, and the unsubscribed terminal which is not a legitimate client cannot acquire the data for the category from the subscription platform server.

Therefore, the encryption key management method of the present disclosure may increase the security of the data subscription system while facilitating the generation, change, and revocation of the encryption key.

BRIEF DESCRIPTION OF THE DRAWINGS

In order that the disclosure may be well understood, there will now be described various forms thereof, given by way of example, reference being made to the accompanying drawings, in which:

FIGS. 6A and 6B are sequence diagrams illustrating a data registration and subscription process in the data subscription system according to an exemplary embodiment of the present disclosure;

FIG. 7 is a sequence diagram illustrating an encryption key update process when the encryption key expires in the data subscription system according to an exemplary embodiment of the present disclosure;

FIG. 9 is a sequence diagram illustrating a process of changing the encryption key due to an unsubscription of a subscriber terminal in the data subscription system according to an embodiment of the present disclosure.

Figure 1:
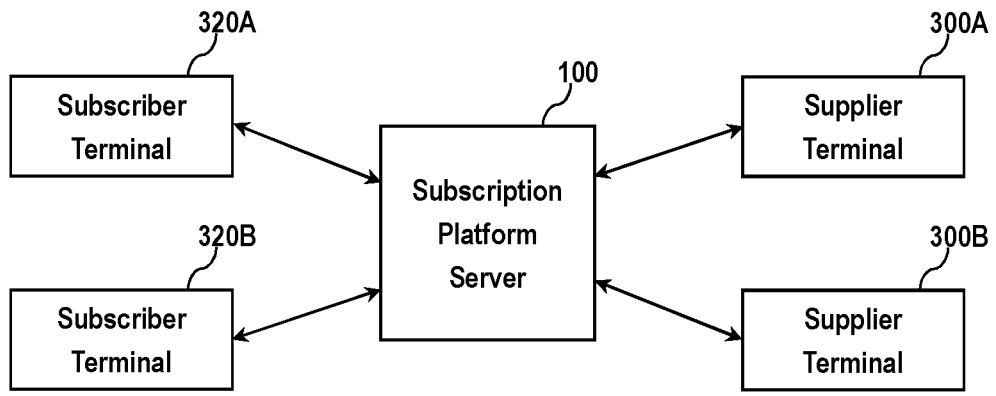
FIG. 1 is a block diagram of a data subscription system according to an exemplary embodiment of the present disclosure.

The drawings described herein are for illustration purposes only and are not intended to limit the scope of the present disclosure in any way.

DETAILED DESCRIPTION

For a more clear understanding of the features and advantages of the present disclosure, exemplary embodiments of the present disclosure will be described in detail with reference to the accompanied drawings. However, it should be understood that the present disclosure is not limited to particular embodiments disclosed herein but includes all modifications, equivalents, and alternatives falling within the spirit and scope of the present disclosure. In the drawings, similar or corresponding components may be designated by the same or similar reference numerals.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. As used herein, the term "and/or" may include a presence of one or more of the associated listed items and any and all combinations of the listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing particular exemplary embodiments only and are not intended to limit the present disclosure. The singular forms include plural referents as well unless the context clearly dictates otherwise. Also, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present disclosure will now be described in detail with reference to the accompanying drawings.

FIG. 1 is a block diagram of a data subscription system according to an exemplary embodiment of the present disclosure. The data subscription system includes a subscription platform server 100, one or more provider terminals 300A and 300B, and one or more subscriber terminals 320A and 320B. The supplier terminals 300A and 300B and the subscriber terminals 320A and 320B may be connected to the subscription platform server 100 through a network such as Internet. Each of the supplier terminals 300A and 300B may be operated by a data provider who supplies content data to the subscription platform server 100. Here, the "supplier" may be referred to as a "creator", "publisher", "organizer", "poster", "editor", "sender", "transmitter", "provider", and the like. Each of the supplier terminals 300A and 300B may be a PC, a mobile device, an Internet-of-Things (IoT) device, or a data management server, but the present disclosure is not limited thereto. Meanwhile, each of the subscriber terminal 320A and 320B may be used by a subscriber who uses the content data registered in the subscription platform server 100. The "subscriber" may be referred to as another term such as "recipient", "user", "service user", and the like. Each of the subscriber terminals 320A and 320B may be a PC, a mobile device, or a data management server, but the present disclosure is not limited thereto.

The subscription platform server 100 may receive and store the content data from the supplier terminals 300A and 300B for one or more topics or categories to and provide the stored content data to one or more of the subscriber terminals 320A and 320B. In particular, the subscription platform server 100 provides the content data to the subscriber terminals 320A and 320B on a premise of based on a service subscription. That is, the subscription platform server 100 may provide regularly or irregularly the content data registered for a certain category only to the subscriber terminal 320A or 320B which has subscribed to the data service for the category. The subscription platform server 100 may receive the content data in an encrypted form from the supplier terminals 300A and 300B. Similarly, the subscription platform server 100 may provide the content data in the encrypted form to one or more subscriber terminals 320A and 320B.

Figure 2:
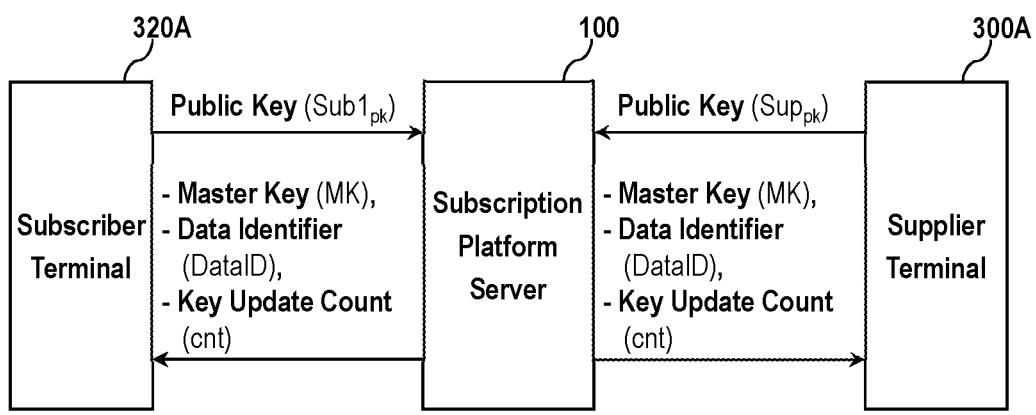
FIG. 2 is an illustration of an encryption key and related information exchanged between a subscription platform server and terminals according to an exemplary embodiment of the present disclosure.

For a secure communication, the subscription platform server 100 may receive public keys from the supplier terminals 300A and 300B and the subscriber terminals 320A and 320B, and may distribute another key to the terminals. FIG. 2 illustrates an encryption key and related information exchanged between the subscription platform server 100 and terminals 300A-320B according to an exemplary embodiment of the present disclosure. In one embodiment, the subscription platform server 100 may receive the public keys $Sup_{pk}$ and $Sub_{pk}$ included in an asymmetric key pair from the supplier terminal 300A and the subscriber terminal 320A, respectively, when the terminals subscribe or sign in the subscription platform server 100. Meanwhile, the subscription platform server 100 may provide a master key (MK), a data identifier (DataID) assigned to each data topic, category, record, file, or supplier of each content data, and a key update count value (cnt) indicating an update version to the terminals 300A-320B at a certain time. Detailed meaning and usage of each information will be described below.

Each supplier terminal 300A or 300B may submit a data registration request to the subscription platform server 100, and may transmit the content data related to the data registration request to the subscription platform server 100 so that the subscription platform server 100 may register the content data. The content data supplied by of the supplier terminal 300A or 300B may be one-time data, but may be time-series data generated regularly or irregularly. As mentioned above, the supplier terminal 300A or 300B may transmit the content data to the subscription platform server 100 in an encrypted form. In an exemplary embodiment, a symmetric key derived from the master key (MK) received from the subscription platform server 100 may be used for encrypting the content data.

Each subscriber terminal 320A or 320B may submit a subscription application to the subscription platform server 100 to receive the content data registered with the subscription platform server 100. The content data received by the subscriber terminal 320A or 320B may belong to a specific topic or category selected by the subscriber terminal at the time of or after the subscription application. As mentioned above, the subscriber terminal 320A or 320B may receive the content data from the subscription platform server 100 in the encrypted form. In an exemplary embodiment, the data transmitted by the subscription platform server 100 to the subscriber terminal 320A or 320B may be encrypted with the symmetric key.

Figure 3:
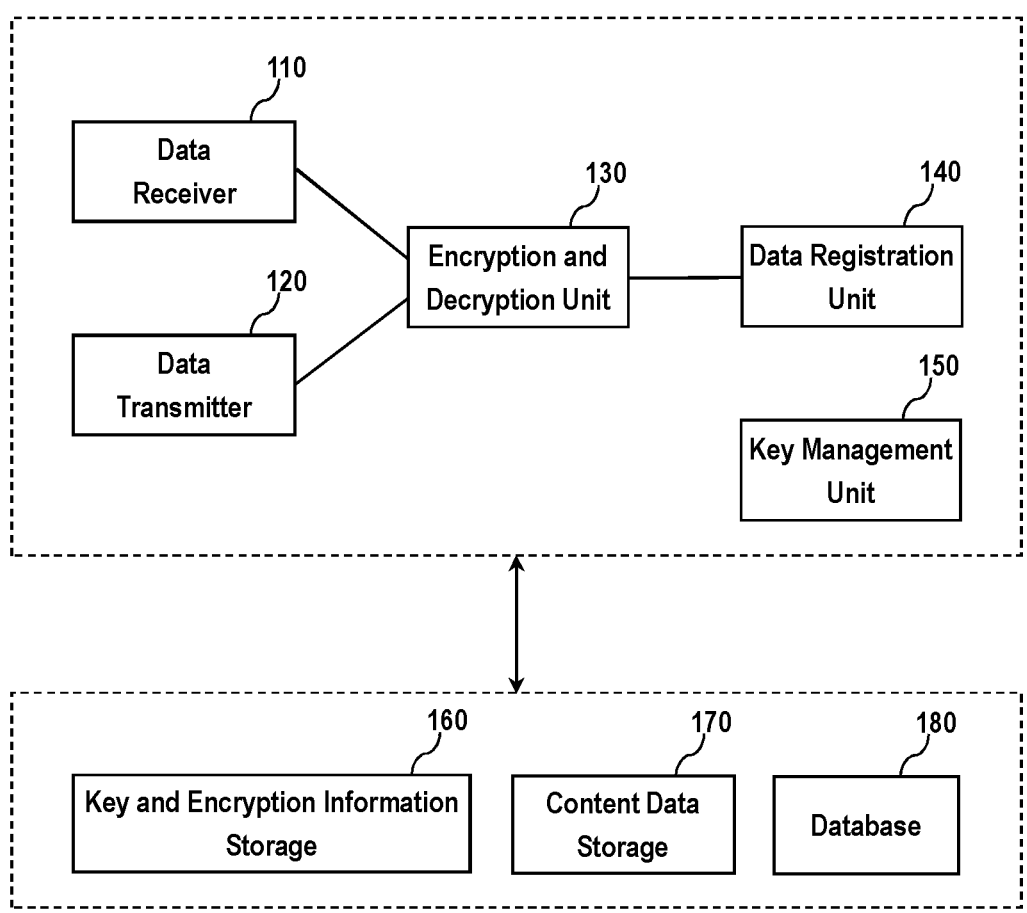
FIG. 3 is a functional block diagram of the subscription platform server shown in FIG. 1.

FIG. 3 is a functional block diagram of the subscription platform server 100 according to an exemplary embodiment of the present disclosure. The subscription platform server 100 may include a data receiver 110, a data transmitter 120, an encryption and decryption unit 130, a data registration unit 140, and a key management unit 120. In addition, the subscription platform server 100 may further include a key and encryption information storage 160, a content data storage 170, and a database 180.

The data receiver 110 may receive the encrypted content data from the supplier terminal 300A or 300B. The data transmitter 120 may provide the subscriber terminal 320A or 320B with the content data which belongs to the category to which the subscriber terminal 320A or 320B subscribed in advance. The encryption and decryption unit 130 may decrypt the content data received by the data receiver 110 from the supplier terminal 300A or 300B, so that the data registration unit 130 may register the decrypted content data in the content data storage 170 and the database 180. In addition, the encryption and decryption unit 130 may encrypt the content data to be transmitted by the data transmitter 120 to the subscriber terminal 320A or 320B. The data registration unit 140 may store the content data received from the supplier terminal 300A or 300B through the data receiver 110 in the content data storage 170 in the encrypted form or a decrypted form, and may register information associated with the content data in the database 180. The key management unit 150 may manage the key required for the data encryption and decryption and related information in the key and encryption information storage 160.

Figure 4:
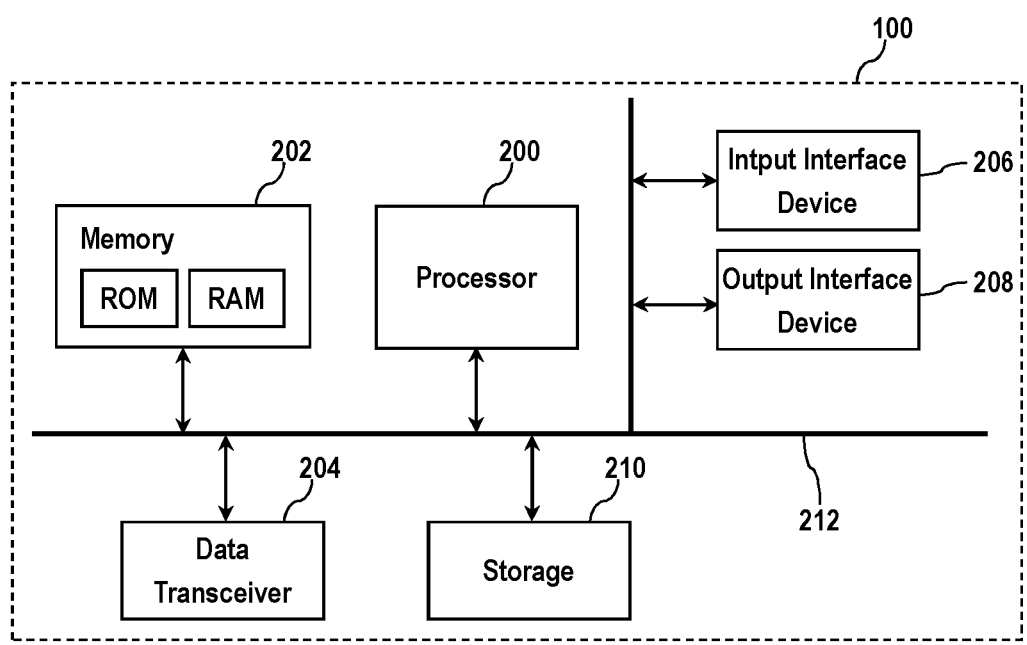
FIG. 4 is a physical block diagram of the subscription platform server shown in FIG. 1.

FIG. 4 is a physical block diagram of the subscription platform server 100. The subscription platform server 100 may include at least one processor 200, a memory 202 storing at least one program instruction to be executed by the processor 300 and a result of an instruction execution, and a data transceiver 204 performing communications with the supplier terminals 300A and 300B and the subscriber terminals 320A and 320B through the network. The subscription platform server 100 may further include an input interface device 206, an output interface device 208, and a storage 210. The components of the subscription platform server 100 may be connected to each other by a bus 212.

The processor 200 may execute program instructions stored in the memory 202 or the storage 106. The processor 201 may include a central processing unit (CPU) or a graphics processing unit (GPU), or may be implemented by another kind of dedicated processor suitable for performing the method of the present disclosure. The memory may load the program instructions stored in the storage device 210 to provide to the processor 200 so that the processor 200 may execute the program instructions. The memory 202 may include, for example, a volatile memory such as a read only memory (ROM) and a nonvolatile memory such as a random access memory (RAM).

The storage 210 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD). The program instructions stored in the storage device 210 is suitable for implementing the encryption key management method according to the present disclosure. The data stored in the storage device 210 may include the content data registered according to the registration request of the supplier terminals 300A and 300B, the keys and related information stored by the key and encryption information storage unit 160, and the database 180.

Figure 5:
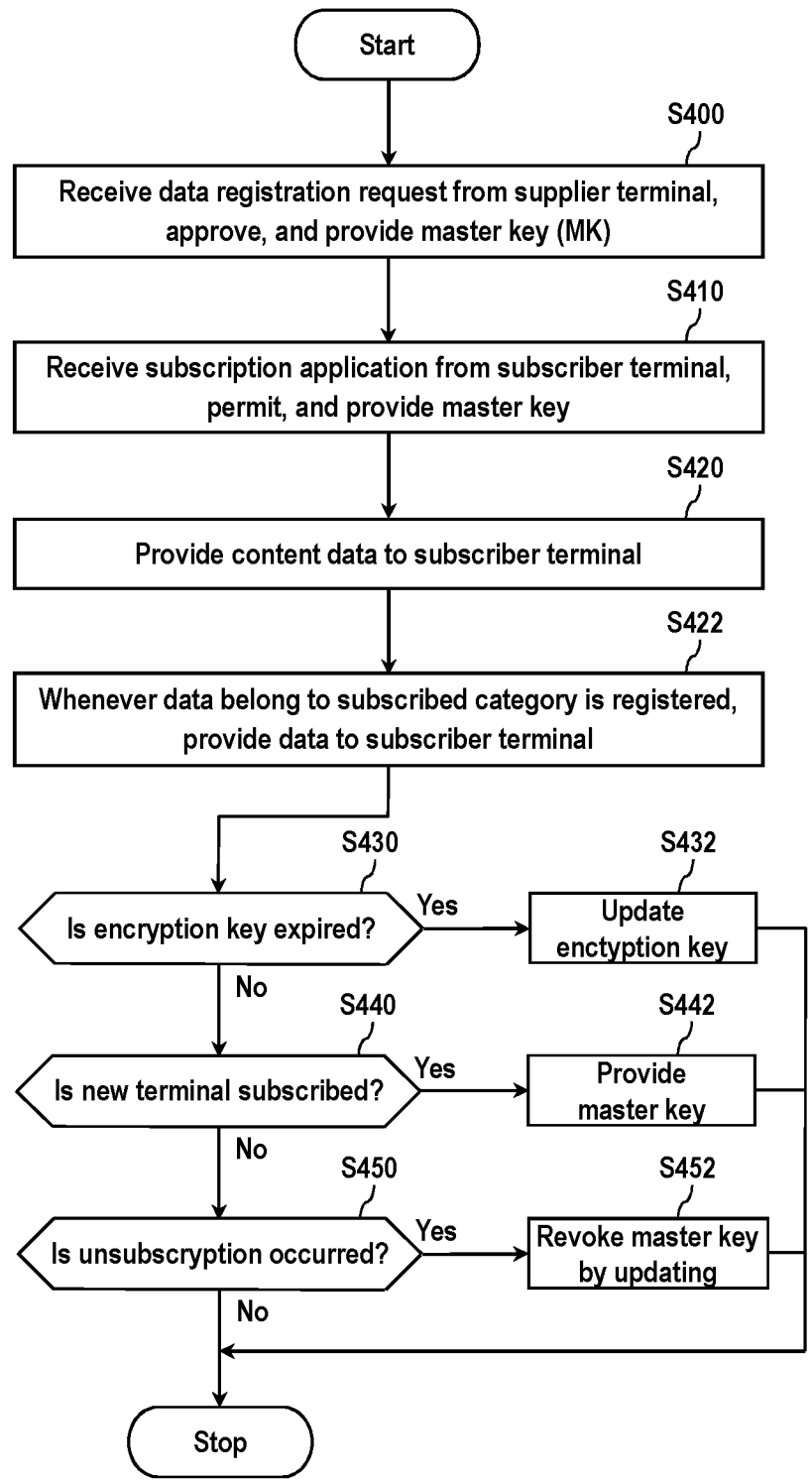
FIG. 5 is a flowchart showing an overall operation of the subscription platform server according to an exemplary embodiment of the present disclosure.

FIG. 5 is a flowchart showing an overall operation of the subscription platform server 100 according to an exemplary embodiment of the present disclosure.

First, the subscription platform server 100 may receive a data registration request message from the supplier terminal 300A and approve the data registration. When approving the data registration, the subscription platform server 100 may provide the supplier terminal 300A with the master key so that the supplier terminal 300A derive the encryption key based on the master key (S400). The subscription platform server 100 may receive the content data from the supplier terminal 300A in the form encrypted with the encryption key and register the content data by storing the encrypted content data or the decrypted content data in the content data storage 170 and storing the related information in the database 180.

Before or after the operation 400, the subscription platform server 100 may receive a subscription application message from the subscriber terminal 320A and may permit the subscription of the subscriber terminal 320A. When permitting the subscription, the subscription platform server 100 may provide the subscriber terminal 320A with the master key so that the supplier terminal 300A derive the encryption key based on the master key (S410). Information about the subscriber terminal 320A for which the subscription is permitted and the topic or category associated with the subscription may be stored in the database 180.

After the subscription is permitted, content data belonging to the subscribed topic or category may be provided to the subscriber terminal 320A having subscribed the category (S420). Also, whenever the content data belonging to the subscribed category is registered, the subscriber terminal 320A may provide the content data to the subscriber terminal 320A (S422). The supplier terminal 300A may provide the content data to the subscription platform server 100 in the form encrypted with the encryption key. Whenever new content data is registered from the supplier terminal 300A, the subscription platform server 100 may decrypt the encrypted content data and verify an integrity of the content data by the hash value. In addition, the subscription platform server 100 may provide the registered content data to the subscriber terminal 320A in the encrypted form to prevent a forgery or falsification of the content data and an unauthorized use of a third party entity.

Afterwards, when the valid period of the encryption key expires (S430), the subscription platform server 100 may provide an updated master key to the supplier terminal 300A and the subscriber terminal 320A, so that the encryption key maintained by the supplier terminal 300A and the subscriber terminal 320A may be updated (S432).

When a new subscriber terminal 320B subscribes to the data service of the subscription platform server 100, (S440), the subscription platform server 100 may provide the master key to the new subscriber terminal 320B as well, so that the new subscriber terminal 320B may derive the encryption key, decrypt the content data with the derived encryption key, and use the content data (S442).

On the other hand, when the subscriber terminal 320A unsubscribes the data service (S 450), the subscription platform server 100 may provide a new master key (MK) to the supplier terminal 300A and the subscriber terminal 320B remaining in a subscription terminal list, so that the supplier terminal 300A and the subscriber terminal 320B may discard the old encryption key by deriving an updated encryption key (step 452).

FIGS. 6A and 6B are sequence diagrams illustrating a data registration and subscription process in the data subscription system according to an exemplary embodiment of the present disclosure.

Upon receiving the data registration request from the supplier terminal 300A (S500), the subscription platform server 100 may generate the data identifier (DataID) associated with the content data requested to be registered (S502). Here, the data identifier (DataID) may be generated according to the topic or category of the content data, or may be generated for each content data record or file. In addition, the subscription platform server 100 may generate the master key (MK) and set the key update count value (cnt) indicating the key update version (S502). The key update count value (cnt) is an integer having an initial value of "1", for example, and may be incremented by "1" each time the key is updated. However, the present disclosure is not limited thereto, and the initial value or the increased value of the key update count value (cnt) may have a value other than "1". The subscription platform server 100 may register the data identifier (DataID), the master key (MK), and the key update count value (cnt) in the key and encryption information storage 160 of the storage device 210.

When requesting the data registration or when subscribing to or signing in the system, the supplier terminal 300A may provide its public key ($Sup_{pk}$) to the subscription platform server 100. Upon receiving the public key ($Sup_{pk}$) of the supplier terminal 300A, the subscription platform server 100 may store the public key ($Sup_{pk}$) of the supplier terminal 300A in the key and encryption information storage 160 of the storage device 210. In operation 506, the subscription platform server 100 may encrypt the master key (MK) with the public key ($Sup_{pk}$) of the supplier terminal 300A having submitted the data registration request (i.e. PubEnc[$Sup_{pk}$; MK]). Then, the subscription platform server 100 may transmit a registration completion message including an encrypted master key (PubEnc[$Sup_{pk}$; MK]), the data identifier (DataID), and the key update count value (cnt) to the supplier terminal 300A (S508).

Meanwhile, the subscriber terminal 320A may transmit a subscription application message to the subscription platform server 100 (S510). The subscription application message may include the data identifier (DataID) indicating the topic or category of the content data to receive from the subscription platform server 100. The data identifier (DataID) may be selected from a menu provided by the subscription platform server 100 or may be stored in the subscriber terminal 320A in advance. In addition, when applying for data subscription or when subscribing to or signing in the system, the subscriber terminal 320A may provide its public key ($Sub1_{pk}$) to the subscription platform server 100. Upon receiving the public key ($Sub1_{pk}$) of the subscriber terminal 320A, the subscription platform server 100 may store the public key ($Sub1_{pk}$) of the subscriber terminal 320A in the key and encryption information storage 160 of the storage device 210. After receiving the subscription application message from the subscriber terminal 320A, the subscription platform server 100 may encrypt the master key (MK) with the public key ($Sub1_{pk}$) of the subscriber terminal 320A having submitted the submission application message (i.e. PubEnc[$Sub1_{pk}$; MK]) (S512). Then, the subscription platform server 100 may transmit a subscription permission message including an encrypted master key (PubEnc[$Sub1_{pk}$; MK]) and the key update count value (cnt) to the subscriber terminal 320A (S514).

On the other hand, after receiving the encrypted master key (PubEnc[$Sup_{pk}$; MK]) in the operation 508, the supplier terminal 300A may decrypt the encrypted master key (PubEnc[$Sup_{pk}$; MK]) with its private key (Supsk) to restore the master key (MK) (i.e., MK=PubDec[$Sup_{pk}$; (PubEnc[$Sup_{pk}$; MK])]) (S516). Similarly, after receiving the encrypted master key (PubEnc[$Sub1_{pk}$; MK]) in the operation 514, the subscriber terminal 320A may decrypt the encrypted master key (PubEnc[$Sub1_{pk}$; MK]) with its private key (Sub1sk) to restore the master key (MK) (i.e., MK=PubDec[Sub1sk; (PubEnc[$Sub1_{pk}$; MK])]) (S518).

Afterwards, the subscription platform server 100 may derive a symmetric key ($k_{cnt}$) from the master key (MK), the data identifier (DataID), and the key update count value (cnt) by a key derivation function (KDF) (i.e., $k_{cnt}$=KDF(MK, DataID, cnt) (S520). Similarly, the supplier terminal 300A and the subscriber terminal 320A may also derive the symmetric key ($k_{cnt}$) from the master key (MK), the data identifier (DataID), and the key update count value (cnt) by using the key derivation function (KDF) (S522, S524).

As described above, the master key (MK) may be encrypted with the public key and delivered safely from the subscription platform server 100 to the supplier terminal 300A and the subscriber terminal 320A. Also, the subscription platform server 100, the supplier terminal 300A, and the subscriber terminal 320A may secure the same symmetric key ($k_{cnt}$) by deriving from the master key (MK). In particular, since the symmetric key ($k_{cnt}$) is derived based on the data identifier (DataID) and the key update count value (cnt) as well as the master key (MK), any subscriber having no permission to a category cannot derive the symmetric key ($k_{cnt}$) for the data identifier (DataID) associated with the category and thus cannot decrypt and use the content data.

After securing the symmetric key ($k_{cnt}$), the supplier terminal 300A may encrypt the content data to be registered in the subscription platform server 100 with the symmetric key ($k_{cnt}$) (i.e., SymEnc[$k_{cnt}$; Data]), calculate a hash for the content data, and transmit the encrypted content data together with the hash to the subscription platform server 100 for the registration (S530, S532). The subscription platform server 100 may decrypt the encrypted content data (SymEnc[$k_{cnt}$; Data]) received from the supplier terminal 300A with the symmetric key ($k_{cnt}$) to restore the content data (i.e., Data'=SymDec[$k_{cnt}$; (SymEnc[$k_{cnt}$; Data])]). The subscription platform server 100 may calculate a hash (Hash(Data')) for the restored data and verify the integrity of the received data by comparing the hash (Hash(Data')) calculated for the restored data with the hash (Hash(Data)) received from the supplier terminal 300A (S534).

If the verification is successful in the operation 534, the subscription platform server 100 may register the received content data by storing in the content data storage 170 of the storage device 210 (S536). In an exemplary embodiment, the subscription platform server 100 may store the encrypted data (SymEnc[$k_{cnt}$; Data]) and the hash (Hash(Data)) received from the supplier terminal 300A in the content data storage 170. Then, the subscription platform server 100 may transmit the encrypted content data (SymEnc[$k_{cnt}$; Data]) and the hash (Hash(Data)) to the subscriber terminal 320A (S538). Upon receiving the encrypted content data (SymEnc [$k_{cnt}$; Data]) and the hash (Hash(Data)), the subscriber terminal 320A may decrypt the encrypted content data (SymEnc[$k_{cnt}$; Data]) with the symmetric key ($k_{cnt}$) to restore the content data (i.e., Data"=SymDec[$k_{cnt}$; (SymEnc [$k_{cnt}$; Data])]). The subscriber terminal 320A may calculate a hash (Hash(Data")) for the restored data and verify the integrity of the received data by comparing the hash (Hash (Data")) calculated for the restored data with the hash (Hash(Data)) received from the subscription platform server 100 (S540). If the verification is successful, the subscriber terminal 320A may store the restored content data in its storage so as to make it available to the subscriber.

According to an exemplary embodiment of the present disclosure, since the content data transferred from the supplier terminal 300A to the subscriber terminal 320A via the subscription platform server 100 is encrypted with the encryption key shared by legitimate entities, the security, confidentiality, and integrity of the content data may be guaranteed.

FIG. 7 is a sequence diagram illustrating an encryption key update process when the encryption key expires in the data subscription system according to an exemplary embodiment of the present disclosure.

When a validity period of the symmetric key ($k_{cnt}$) used to encrypt the content data associated with a specific data identifier (DataID) has expired or is about to expire, the subscription platform server 100 may change the key update count value (cnt) (S600). As mentioned above, the key update count value (cnt) may be incremented by one. Alternatively, however, the key update count value (cnt) may be changed by a value other than one. In such a case, the increment value of the key update count value (cnt) may be set according to a predetermined rule or schedule, or may be set based on a random number or a pseudorandom number generated by the subscription platform server 100.

Subsequently, the subscription platform server 100 may transmit an encryption key update request message to the supplier terminal 300A supplying the content data related with the encryption key that needs to be updated and the subscriber terminal 320A having subscribed to the content data related with the encryption key that needs to be updated (S602, S604). The encryption key update request message may include the data identifier (DataID) associated with the encryption key that needs to be updated and the changed key update count value (cnt).

After transmitting the encryption key update request message, the subscription platform server 100 may derive the symmetric key ($k_{cnt}$) from the master key (MK), the data identifier (DataID), and the key update count value (cnt) by the key derivation function (KDF) (i.e., $k_{cnt}$=KDF(MK, DataID, cnt) (S606). Meanwhile, after receiving the encryption key update request message, the supplier terminal 300A and the subscriber terminal 320A may also derive the symmetric key ($k_{cnt}$) from the master key (MK), the data identifier (DataID), and the key update count value (cnt) by using the key derivation function (KDF) (S608, S610). As a result, the symmetric key ($k_{cnt}$) maintained by the subscription platform server 100, the supplier terminal 300A, and the subscriber terminal 320A may be derived and updated based on the changed key update count value (cnt) corresponding to the data identifier (DataID).

After the symmetric key ($k_{cnt}$) is updated, the content data of the supplier terminal 300A may be encrypted with the symmetric key ($k_{cnt}$) and provided to the subscriber terminal 320A through the subscription platform server 100 (S630-S640), which operations are similar to the operations S530-540 shown in FIG. 6B. That is, the supplier terminal 300A may encrypt the content data with the symmetric key ($k_{cnt}$) (i.e., SymEnc[$k_{cnt}$; Data]), calculate a hash for the content data, and transmit the encrypted content data together with the hash to the subscription platform server 100 for the registration (S630, S632). The subscription platform server 100 may decrypt the encrypted content data (SymEnc[$k_{cnt}$; Data]) received from the supplier terminal 300A with the symmetric key ($k_{cnt}$) to restore the content data (i.e., Data'=SymDec[$k_{cnt}$; (SymEnc[$k_{cnt}$; Data])]). The subscription platform server 100 may calculate a hash (Hash(Data')) for the restored data and verify the integrity of the received data by comparing the hash (Hash(Data')) calculated for the restored data with the hash (Hash(Data)) received from the supplier terminal 300A (S634). If the verification is successful, the subscription platform server 100 may register the received content data by storing in the content data storage 170 of the storage device 210 (S636). In an exemplary embodiment, the content data may be stored in the content data storage 170 in the encrypted form (SymEnc[$k_{cnt}$; Data]). Then, the subscription platform server 100 may transmit the encrypted content data (SymEnc[$k_{cnt}$; Data]) and the hash (Hash(Data)) to the subscriber terminal 320A (S638). Upon receiving the encrypted content data (SymEnc[$k_{cnt}$; Data]) and the hash (Hash(Data)), the subscriber terminal 320A may decrypt the encrypted content data (SymEnc[$k_{cnt}$; Data]) with the symmetric key ($k_{cnt}$) to restore the content data (i.e., Data''=SymDec[$k_{cnt}$; (SymEnc[$k_{cnt}$; Data])]). The subscriber terminal 320A may calculate a hash (Hash(Data'')) for the restored data and verify the integrity of the received data by comparing the hash (Hash(Data'')) calculated for the restored data with the hash (Hash(Data)) received from the subscription platform server 100 (S640). If the verification is successful, the subscriber terminal 320A may store the restored content data in its storage so as to make it available to the subscriber.

Figure 8:
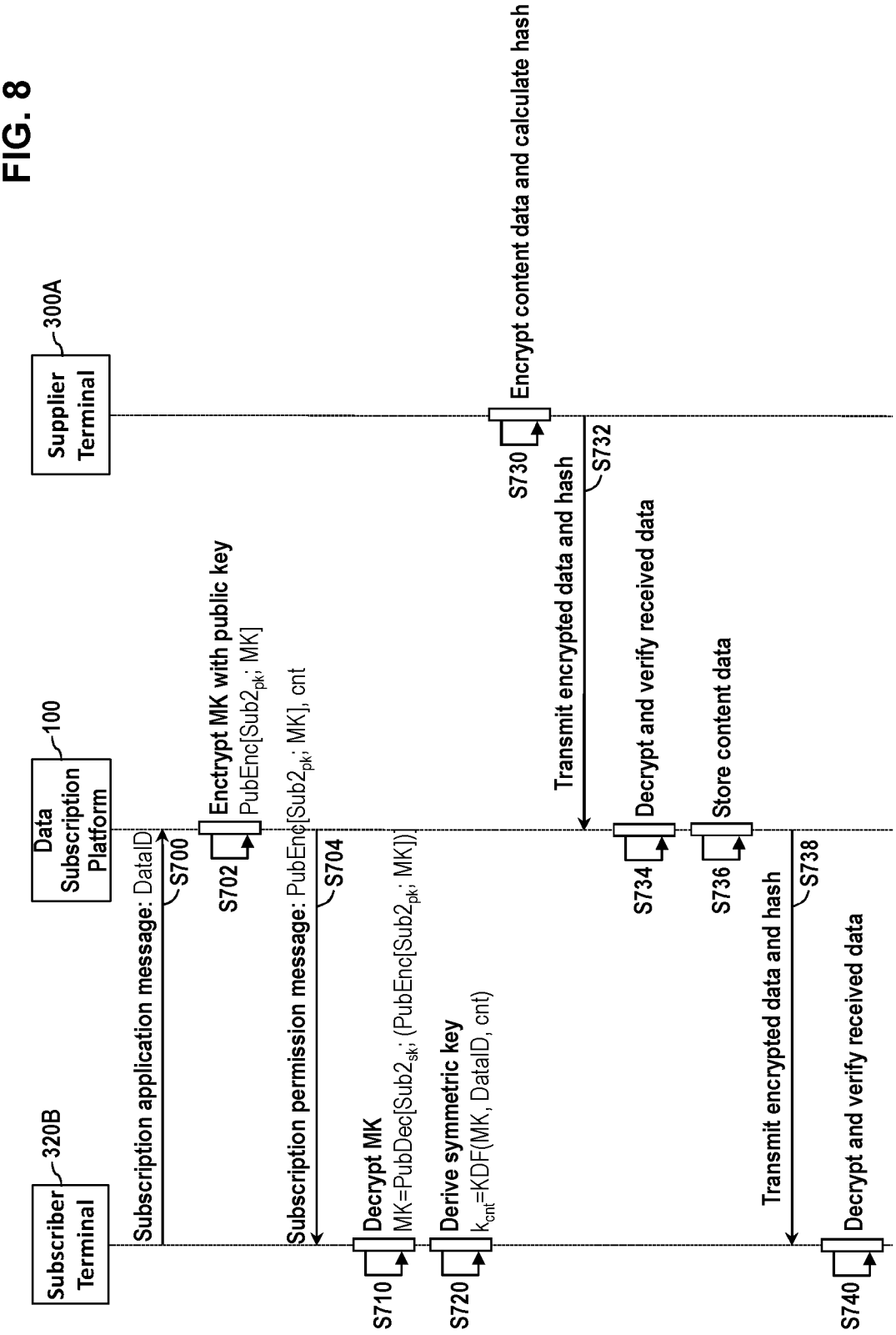
FIG. 8 is a sequence diagram illustrating a process of installing the encryption key in a new subscriber terminal and providing data to the new terminal in the data subscription system according to an exemplary embodiment of the present disclosure.

FIG. 8 is a sequence diagram illustrating a process of installing the encryption key in a new subscriber terminal and providing data to the new terminal in the data subscription system according to an exemplary embodiment of the present disclosure.

In addition to the existing subscriber terminal 320A, the subscriber terminal 320B may apply for the data subscription to the subscription platform server 100 (S700). The subscription application message may include the data identifier (DataID) indicating the topic or category of the content data to receive from the subscription platform server 100. In addition, when applying for data subscription or when subscribing to or signing in the system, the subscriber terminal 320B may provide its public key ($Sub2_{pk}$) to the subscription platform server 100. Upon receiving the public key ($Sub2_{pk}$) of the subscriber terminal 320B, the subscription platform server 100 may store the public key ($Sub2_{pk}$) of the subscriber terminal 320B in the key and encryption information storage 160 of the storage device 210. After receiving the subscription application message from the subscriber terminal 320B, the subscription platform server 100 may encrypt the master key (MK) with the public key ($Sub2_{pk}$) of the subscriber terminal 320B having submitted the submission application message (i.e. PubEnc[$Sub2_{pk}$; MK]) (S702). Then, the subscription platform server 100 may transmit the subscription permission message including an encrypted master key (PubEnc[$Sub2_{pk}$; MK]) and the key update count value (cnt) to the subscriber terminal 320B (S704).

After receiving the encrypted master key (PubEnc[$Sup_{pk}$; MK]) included in the subscription permission message, the new supplier terminal 300B may decrypt the encrypted master key (PubEnc[$Sub2_{pk}$; MK]) with its private key (Sub2sk) to restore the master key (MK) (i.e., MK=PubDec[Sub2sk; (PubEnc[$Sub2_{pk}$; MK])]) (S710). Also, the new subscriber terminal 320B may derive the symmetric key ($k_{cnt}$) from the master key (MK), the data identifier (DataID), and the key update count value (cnt) by using the key derivation function (KDF) (S712). As a result, the new subscriber terminal 320B may be equipped with the same symmetric key ($k_{cnt}$) as the subscription platform server 100, the supplier terminal 300A, and the existing subscriber terminal 320A.

Accordingly, the new subscriber terminal 320B may be provided with the same data service as the existing subscriber terminal 320A in the operations S730-S740, which are similar to the operations S530-540 shown in FIG. 6B. That is, the supplier terminal 300A may encrypt the content data with the symmetric key ($k_{cnt}$) (i.e., SymEnc[$k_{cnt}$; Data]), calculate the hash for the content data, and transmit the encrypted content data and the hash to the subscription platform server 100 for the registration (S730, S732). The subscription platform server 100 may decrypt the encrypted content data (SymEnc[$k_{cnt}$; Data]) received from the supplier terminal 300A with the symmetric key ($k_{cnt}$) to restore the content data (i.e., Data'=SymDec[$k_{cnt}$; (SymEnc[$k_{cnt}$; Data])]). The subscription platform server 100 may calculate the hash (Hash(Data')) for the restored data and verify the integrity of the received data by comparing the hash (Hash(Data')) calculated for the restored data with the hash (Hash(Data)) received from the supplier terminal 300A (S734). If the verification is successful, the subscription platform server 100 may register the received content data by storing in the content data storage 170 of the storage device 210 (S736). In an exemplary embodiment, the content data may be stored in the content data storage 170 in the encrypted form (SymEnc[$k_{cnt}$; Data]). Then, the subscription platform server 100 may transmit the encrypted content data (SymEnc[$k_{cnt}$; Data]) and the hash (Hash(Data)) to the new subscriber terminal 320B (S738). Upon receiving the encrypted content data (SymEnc[$k_{cnt}$; Data]) and the hash (Hash(Data)), the new subscriber terminal 320B may decrypt the encrypted content data (SymEnc[$k_{cnt}$; Data]) with the symmetric key ($k_{cnt}$) to restore the content data (i.e., Data''=SymDec[$k_{cnt}$; (SymEnc[$k_{cnt}$; Data])]). The new subscriber terminal 320B may calculate the hash (Hash(Data'')) for the restored data and verify the integrity of the received data by comparing the hash (Hash(Data'')) calculated for the restored data with the hash (Hash(Data)) received from the subscription platform server 100 (S740). If the verification is successful, the new subscriber terminal 320B may store the restored content data in its storage so as to make it available to the sub scriber.

FIG. 9 is a sequence diagram illustrating a process of changing the encryption key due to an unsubscription of a subscriber terminal in the data subscription system according to an embodiment of the present disclosure.

Here, it is assumed that the supplier terminal 300A supplies the content data as described above, and the subscriber terminal 320A of the two terminals 320A and 320B has revoked the subscription. When there occurs an unsubscription of the terminal, the subscription platform server 100 may generate a new master key (MK), and may also set or update the key update count value (cnt) additionally (S800). The subscription platform server 100 may register the new master key (MK) and the changed key update count value (cnt) in the key and encryption information storage unit 160 of the storage device 210.

Subsequently, the subscription platform server 100 may encrypt the master key (MK) with the public key ($Sup_{pk}$) of the supplier terminal 300A (i.e., PubEnc[$Sup_{pk}$; MK]), and may encrypt the master key (MK) with the public key ($Sub2_{pk}$) of the remaining subscriber terminal 320B (i.e., PubEnc[$Sub2_{pk}$; MK]) (S802). The subscription platform server 100 may transmit a key derivation request message including the encrypted master key (PubEnc[$Sup_{pk}$; MK]), the data identifier (DataID), and the key update count value (cnt) to the supplier terminal 300A, and may transmit another key derivation request message including the encrypted master key (PubEnc[$Sub2_{pk}$; MK]), the data identifier (DataID), and the key update count value (cnt) to the subscriber terminal 320B (S804, S806).

After receiving the encrypted master key (PubEnc[$Sup_{pk}$; MK]) included in the key derivation request message, the supplier terminal 300A may decrypt the encrypted master key (PubEnc[$Sup_{pk}$; MK]) with its private key ($Sup_{sk}$) to restore the master key (MK) (i.e., MK=PubDec[$Sup_{sk}$; (PubEnc[$Sup_{pk}$; MK])]) (S816). Similarly, after receiving the encrypted master key (PubEnc[$Sup_{pk}$; MK]) included in the key derivation request message, the subscriber terminal 320B may decrypt the encrypted master key (PubEnc[$Sub2_{pk}$; MK]) with its private key ($Sub2_{sk}$) to restore the master key (MK) (i.e., MK=PubDec[$Sub2_{sk}$; (PubEnc[$Sub2_{pk}$; MK])]) (S818). On the other hand, the subscription platform server 100 may derive the symmetric key ($k_{cnt}$) from the master key (MK), the data identifier (DataID), and the key update count value (cnt) by the key derivation function (KDF) (i.e., $k_{cnt}$=KDF(MK, DataID, cnt)) (S820). Similarly, the supplier terminal 300A and the subscriber terminal 320B may derive the symmetric key ($k_{cnt}$) from the master key (MK), the data identifier (DataID), and the key update count value (cnt) by using the key derivation function (KDF) (S822, S824).

As described above, when the unsubscription occurs, a new master key (MK) may be generated by the subscription platform server 100, and the new master key (MK) may be encrypted with the public key and delivered safely to the supplier terminal 300A and the remaining subscriber terminal 320B. While the symmetric key ($k_{cnt}$) of the subscription platform server 100, the supplier terminal 300A, and the remaining subscriber terminal 320B may be updated by the derivations based on the new master key (MK), the symmetric key of the unsubscribed terminal 320A is not updated any more. Therefore, the symmetric key of the unsubscribed terminal 320A is substantially revoked, and the unsubscribed terminal 320A which is not a legitimate client cannot acquire the data for the category from the subscription platform server 100.

According to an exemplary embodiment of the present disclosure, the update of the master key (MK) and the symmetric key ($k_{cnt}$) due to the unsubscription of the client may be performed whenever the unsubscription occurs. However, when the unsubscription occurs frequently, the update of the master key (MK) and the symmetric key ($k_{cnt}$) may be carried out regularly or irregularly after a plurality of subscribers withdrew the subscription. In such a case, the use of the content data may continue by the unsubscribed user until the key is updated, but the time interval allowed for the use is limited. Also, the data use of the unsubscribed user may be restricted further by controlling the signing-in of the unsubscribed user to the system.

The device and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the device may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An encryption key management method in a data subscription platform server accessible by a supplier terminal and at least one subscriber terminal through a network, comprising:

receiving a data registration request of content data from the supplier terminal, determining a data identifier (DataID) associated with the content data, encrypting a master key (MK) with a public key of the supplier terminal, and providing the supplier terminal with the master key encrypted with the public key of the supplier terminal, the data identifier, and a key update count value (cnt) to enable the supplier terminal to decrypt the master key encrypted with the public key of the supplier terminal and derive a symmetric key based on the master key (MK), the data identifier (DataID), and the key update count value (cnt);

receiving a subscription application related to the data identifier (DataID) from a first subscriber terminal, encrypting the master key with a public key of the first subscriber terminal, and providing the first subscriber terminal with the master key encrypted with the public key of the first subscriber terminal and the key update count value to enable the first subscriber terminal to decrypt the master key encrypted with the public key of the first subscriber terminal and derive the symmetric key based on the master key (MK), the data identifier (DataID), and the key update count value (cnt);

receiving encrypted content data encrypted with the symmetric key and a hash for the content data from the supplier terminal, decrypting the encrypted content data, and verifying the content data using the hash; and transmitting the encrypted content data and the hash to the first subscriber terminal to enable the first subscriber terminal to decrypt the encrypted content data, verify the content data using the hash, and use the content data.

2. The method of claim 1, further comprising:

changing the key update count value; and transmitting a key update request message including the data identifier and a changed key update count value to the supplier terminal and the first subscriber terminal to enable the supplier terminal and the first subscriber terminal to update the symmetric key by deriving based on the master key, the data identifier, and the changed key update count value.

3. The method of claim 2, wherein changing the key update count value comprises:

changing the key update count value into a number determined by a predetermined rule.

4. The method of claim 2, wherein changing the key update count value comprises:

determining the key update count value based on a random number generated by a random number generator.

5. The method of claim 1, further comprising:

receiving a subscription application related to the data identifier (DataID) from a second subscriber terminal, encrypting the master key with a public key of the second subscriber terminal, and providing the second subscriber terminal with the master key encrypted with the public key of the second subscriber terminal and the key update count value to enable the second subscriber terminal to decrypt the master key encrypted with the public key of the second subscriber terminal and derive the symmetric key based on the master key (MK), the data identifier (DataID), and the key update count value (cnt), wherein the encrypted content data and the hash for the content data are transmitted to the second subscriber terminal as well as the first subscriber terminal.

6. The method of claim 5, further comprising:

checking a withdrawal of subscription of the first subscriber terminal;

generating an updated master key;

encrypting an updated master key with the public key of the supplier terminal and providing the supplier terminal with an encrypted and updated master key encrypted with the public key of the supplier terminal and the data identifier to enable the supplier terminal to decrypt the encrypted and updated master key encrypted with the public key of the supplier terminal and derive the symmetric key based on the master key, the data identifier, and the key update count value; and encrypting the updated master key with the public key of the second subscriber terminal and providing the second subscriber terminal with an encrypted and updated master key encrypted with the public key of the second subscriber terminal and the data identifier to enable the second subscriber terminal to decrypt the encrypted and updated master key encrypted with the public key of the second subscriber terminal and derive the symmetric key based on the master key, the data identifier, and the key update count value.

7. The method of claim 6, wherein generating the updated master key comprises:

changing the key update count value, wherein a changed key update count value is additionally provided to the supplier terminal when the encrypted and updated master key encrypted with the public key of the supplier terminal and the data identifier are provided to the supplier terminal, wherein the changed key update count value is additionally provided to the second subscriber terminal when the encrypted and updated master key encrypted with the public key of the second subscriber terminal and the data identifier are provided to the second subscriber terminal.

8. An apparatus for providing a data subscription service managing an encryption key suitable for providing content data received from a supplier terminal to at least one subscriber terminal based on a subscription application, comprising:

at least one processor; and a memory storing instructions executable by the at least one processor and, when executed by the at least one processor, causing the at least one processor to:

receive a data registration request of content data from the supplier terminal, determine a data identifier (DataID) associated with the content data, encrypting a master key (MK) with a public key of the supplier terminal, and provide the supplier terminal with the master key encrypted with the public key of the supplier terminal, the data identifier, and a key update count value (cnt) to enable the supplier terminal to decrypt the master key encrypted with the public key of the supplier terminal and derive a symmetric key based on the master key (MK), the data identifier (DataID), and the key update count value (cnt);

receive a subscription application related to the data identifier (DataID) from a first subscriber terminal, encrypt the master key with a public key of the first subscriber terminal, and provide the first subscriber terminal with the master key encrypted with the public key of the first subscriber terminal and the key update count value to enable the first subscriber terminal to decrypt the master key encrypted with the public key of the first subscriber terminal and derive the symmetric key based on the master key (MK), the data identifier (DataID), and the key update count value (cnt);

receive encrypted content data encrypted with the symmetric key and a hash for the content data from the supplier terminal, decrypt the encrypted content data, and verify the content data using the hash; and transmit the encrypted content data and the hash to the first subscriber terminal to enable the first subscriber terminal to decrypt the encrypted content data, verify the content data using the hash, and use the content data.

9. The apparatus of claim 8, wherein the instructions, when executed by the at least one processor, further causes the at least one processor to:

change the key update count value; and transmit a key update request message including the data identifier and a changed key update count value to the supplier terminal and the first subscriber terminal to enable the supplier terminal and the first subscriber terminal to update the symmetric key by deriving based on the master key, the data identifier, and the changed key update count value.

10. The apparatus of claim 9, wherein the instructions causing the at least one processor to change the key update count value causes the at least one processor to:
change the key update count value into a number determined by a predetermined rule.

11. The apparatus of claim 9, wherein the instructions causing the at least one processor to change the key update count value causes the at least one processor to:
determine the key update count value based on a random number generated by a random number generator.

12. The apparatus of claim 8, wherein the instructions, when executed by the at least one processor, further causes the at least one processor to:
receive a subscription application related to the data identifier (DataID) from a second subscriber terminal, encrypt the master key with a public key of the second subscriber terminal, and provide the second subscriber terminal with the master key encrypted with the public key of the second subscriber terminal and the key update count value to enable the second subscriber terminal to decrypt the master key encrypted with the public key of the second subscriber terminal and derive the symmetric key based on the master key (MK), the data identifier (DataID), and the key update count value (cnt),
wherein the encrypted content data and the hash for the content data are transmitted to the second subscriber terminal as well as the first subscriber terminal.

13. The apparatus of claim 12, wherein the instructions, when executed by the at least one processor, further causes the at least one processor to:
check a withdrawal of subscription of the first subscriber terminal;
generate an updated master key;
encrypt an updated master key with the public key of the supplier terminal and provide the supplier terminal with an encrypted and updated master key encrypted with the public key of the supplier terminal and the data identifier to enable the supplier terminal to decrypt the encrypted and updated master key encrypted with the public key of the supplier terminal and derive the symmetric key based on the master key, the data identifier, and the key update count value; and
encrypt the updated master key with the public key of the second subscriber terminal and provide the second subscriber terminal with an encrypted and updated master key encrypted with the public key of the second subscriber terminal and the data identifier to enable the second subscriber terminal to decrypt the encrypted and updated master key encrypted with the public key of the second subscriber terminal and derive the symmetric key based on the master key, the data identifier, and the key update count value.

14. The apparatus of claim 13, wherein the instructions causing the at least one processor to generate the updated master key causes the at least one processor to change the key update count value,
wherein a changed key update count value is additionally provided to the supplier terminal when the encrypted and updated master key encrypted with the public key of the supplier terminal and the data identifier are provided to the supplier terminal,
wherein the changed key update count value is additionally provided to the second subscriber terminal when the encrypted and updated master key encrypted with the public key of the second subscriber terminal and the data identifier are provided to the second subscriber terminal.

* * * * *